(12) United States Patent
Hubscher

(10) Patent No.: US 6,273,517 B1
(45) Date of Patent: Aug. 14, 2001

(54) WHEEL MOUNTED TRACTION DEVICE

(75) Inventor: Darin Hubscher, Manitoba (CA)

(73) Assignee: Hubscher Farms Ltd., Swan River (CA)

( * ) Notice: Subject to any disclaimer, the term of this patent is extended or adjusted under 35 U.S.C. 154(b) by 0 days.

(21) Appl. No.: 09/544,267

(22) Filed: Apr. 6, 2000

(51) Int. Cl.$^7$ .................................................. B60B 15/02
(52) U.S. Cl. .......................................................... 301/44.3
(58) Field of Search ............................... 301/38.1, 40.1, 301/41.1, 43, 44.1, 44.3, 44.4

(56) References Cited

U.S. PATENT DOCUMENTS

| | | | |
|---|---|---|---|
| 901,842 | * 10/1908 | Shattuck | 301/44.4 |
| 1,235,557 | * 8/1917 | Dailey | 301/44.1 |
| 2,240,261 | * 4/1941 | Hodell | 301/44.1 |
| 3,014,547 | * 12/1961 | Lely | 301/41.1 |
| 3,206,253 | * 9/1965 | Bedan et al. | 301/44.1 |
| 3,707,308 | * 12/1972 | Smith | 301/44 |
| 3,709,185 | 1/1973 | Hennel . | |
| 4,077,351 | 3/1978 | Girona . | |
| 4,533,183 | 8/1985 | Gant . | |
| 4,744,324 | 5/1988 | Martinmaas . | |
| 5,062,816 | * 11/1991 | Berglund et al. | 416/74 |
| 5,242,214 | * 9/1993 | Granryd | 301/41.1 |
| 5,692,810 | * 12/1997 | Granryd | 301/41.1 |
| 5,846,053 | * 12/1998 | Hagihara | 416/74 |

FOREIGN PATENT DOCUMENTS

| | | | | |
|---|---|---|---|---|
| 14590 | * | 4/1934 | (AU) | 301/38.1 |
| 102416 | * | 11/1937 | (AU) | 301/38.1 |
| 193506 | * | 1/1938 | (CH) | 301/38.1 |
| 1107104 | * | 5/1961 | (DE) | 301/39.1 |
| 2117331 | * | 10/1983 | (GB) | 301/38.1 |
| 36995 | * | 8/1939 | (IT) | 301/38.1 |

* cited by examiner

Primary Examiner—S. Joseph Morano
Assistant Examiner—Long Bao Nguyen
(74) Attorney, Agent, or Firm—Adrian D. Battison; Michael R. Williams

(57) ABSTRACT

A traction device is provided for installation on the wheel rims of the driven wheels of an all terrain vehicle. The traction device provides added traction when the vehicle is used on soft terrain including mud, sand or snow. The device generally includes an annular frame element which is clamped onto the wheel rim for selective installation and removal thereon. A plurality of paddles are mounted on the annular frame element to extend radially outward therefrom. Each paddle is selectively mounted on the frame member by a removable mounting pin for removing the paddles therefrom as desired. The paddles are constructed of a resilient material so as to deflect when large solid objects such as rocks are encountered.

18 Claims, 3 Drawing Sheets

WHEEL MOUNTED TRACTION DEVICE

FIELD OF THE INVENTION

This invention relates to a wheel mounted traction device arranged to be mounted on a wheel of a vehicle for providing added traction.

BACKGROUND

When using an all terrain vehicle off road, the vehicle frequently encounters soft terrain, for example mud, sand or snow. When the vehicle encounters soft terrain the tires are typically known to sink slightly into the terrain resulting in poor traction. The use of heavily treaded tires or an all wheel drive transmission generally aren't always sufficient to enhance the traction such that the vehicle may occasionally become stuck when encountered with soft terrain.

U.S. Pat. No. 4,533,183 to Gant provides a military wheel tire assembly. The tires include as an auxiliary feature a series of paddles which are integrally mounted on the wheel rims to assist with traction of the vehicle in mud, sand or other soft terrain. The paddles however are integrally mounted with the wheel rims such that installation on a vehicle requires replacement of the entire rim of each wheel and thus the paddles are not adjustable for use on varying types of vehicles. Furthermore, the paddles must be retracted when the vehicle is used on hard terrain as the rigid construction of the paddles would cause the paddles to be damaged if they engaged a solid debris such as a rock.

SUMMARY

According to the present invention there is provided traction device for use with a wheel having a wheel rim with a wheel axis, the traction device comprising:

a frame member having a frame axis;

an adjustable clamping element mounted on the frame member for selectively clamping the frame member on the wheel rim substantially in alignment with the wheel axis thereof; and a plurality of paddles mounted on the frame member in a circumferentially spaced relationship about the frame axis, each paddle including a mounting portion and a flange portion extending outward from the mounting portion to a free end spaced radially outward from the frame axis past a periphery of the frame member.

The use of a clamping element on the traction device allows the device to be easily adapted to existing rims and clamped securely thereon. The device can thus be easily installed or removed from varying types of wheel rims in a simple procedure using common tools without requiring replacement of any existing parts such as the wheel rims of the vehicle on which the device is to be installed.

The frame member preferably includes an inwardly facing mounting face mounting the paddles thereon and an outwardly facing engaging face for engagement with an inner surface of the wheel rim. The frame member can thus be recessed within the wheel rim.

The mounting portion of each paddle preferably extends axially outward from the frame member and the flange portion preferably extends radially outward from the mounting portion. This permits the frame member to be recessed within the wheel rim.

When the wheel rim includes a peripheral rim flange, the frame member preferably includes a plurality of mounting flanges extending radially outward therefrom for being received within the rim flange of the wheel rim. The mounting flanges provide axial support between the frame member and the wheel rim.

When the wheel rim includes an annular groove about an inner surface thereof, the frame member preferably includes a peripheral raised protrusion for being received within the annular groove of the wheel rim. The peripheral raised protrusion provides axial support between the frame member and the wheel rim similarly to the mounting flanges.

The frame member may comprise a plurality of arcuate sections selectively coupled to each other at respective ends thereof. In the preferred embodiment there is provided two arcuate sections.

There may be provided a clamping element coupling each adjacent pair of ends of the arcuate sections together such that mounting the clamping elements under compression engages the frame member within the wheel rim.

Each clamping element may comprise a threaded member secured between a corresponding pair of arcuate sections.

There may be provided a plurality of channels mounted on the frame member arranged to slidably mount the respective paddles therein such that the paddles are selectively separable therefrom.

There may be provided a locking member arranged to be mounted on each channel member for selectively mounting the corresponding paddle in a fixed relationship thereon.

The paddles are preferably formed of resilient material.

There may be provided a plurality of radially extending ridges mounted along respective sides of each paddle to resist bending of the paddle in a radial direction.

A thickness of each paddle may be tapered towards the free end thereof such that the resiliency of each paddle increases towards the free end thereof.

According to a further aspect of the present invention there is provided a traction device for use with a wheel having a wheel rim supporting a tire thereon, the traction device comprising:

a plurality of channel members arranged to be mounted in a circumferentially spaced relationship about a central axis for mounting on the wheel rim;

a paddle associated with each channel member, each paddle having a mounting portion slidably received within the corresponding channel member to extend axially outward therefrom and a flange portion extending outward from the mounting portion to a free end spaced radially outward from the central axis past the corresponding channel member; and a locking member arranged to be mounted on each channel member for selectively mounting the corresponding paddle in a fixed relationship thereon such that the paddles are selectively separable from the respective channel members.

The use of a locking member on each paddle of the traction device allows the individual paddles to be removed and replaced without removing the frame member or the channels supporting the paddles thereon from the wheel rim of the vehicle. This further simplifies installation and removal of the paddles for accommodating different applications of the vehicle having the traction device installed on the wheels thereof. The individual construction of each paddle may thus also be varied without replacing the frame member supporting the paddles thereon. The use of paddles made of resilient material is particularly useful such that the paddles are able to deflect when engaging large debris such as rocks without damaging the paddles.

Each channel member preferably comprises a tubular member of rectangular cross section having a longitudinal axis arranged to extend substantially parallel to the central axis.

Each locking member may comprise an elongate member extending through co-operating apertures in the corresponding channel member and paddle respectively.

The paddles are preferably formed of resilient material.

There may be provided a plurality of radially extending ridges mounted along respective sides of each paddle to resist bending of the paddle in a radial direction.

A thickness of each paddle may be tapered towards the free end thereof such that the resiliency of each paddle increases towards the free end thereof.

BRIEF DESCRIPTION OF THE DRAWINGS

In the accompanying drawings, which illustrate exemplary embodiments the present invention.

DETAILED DESCRIPTION

Figure 1:
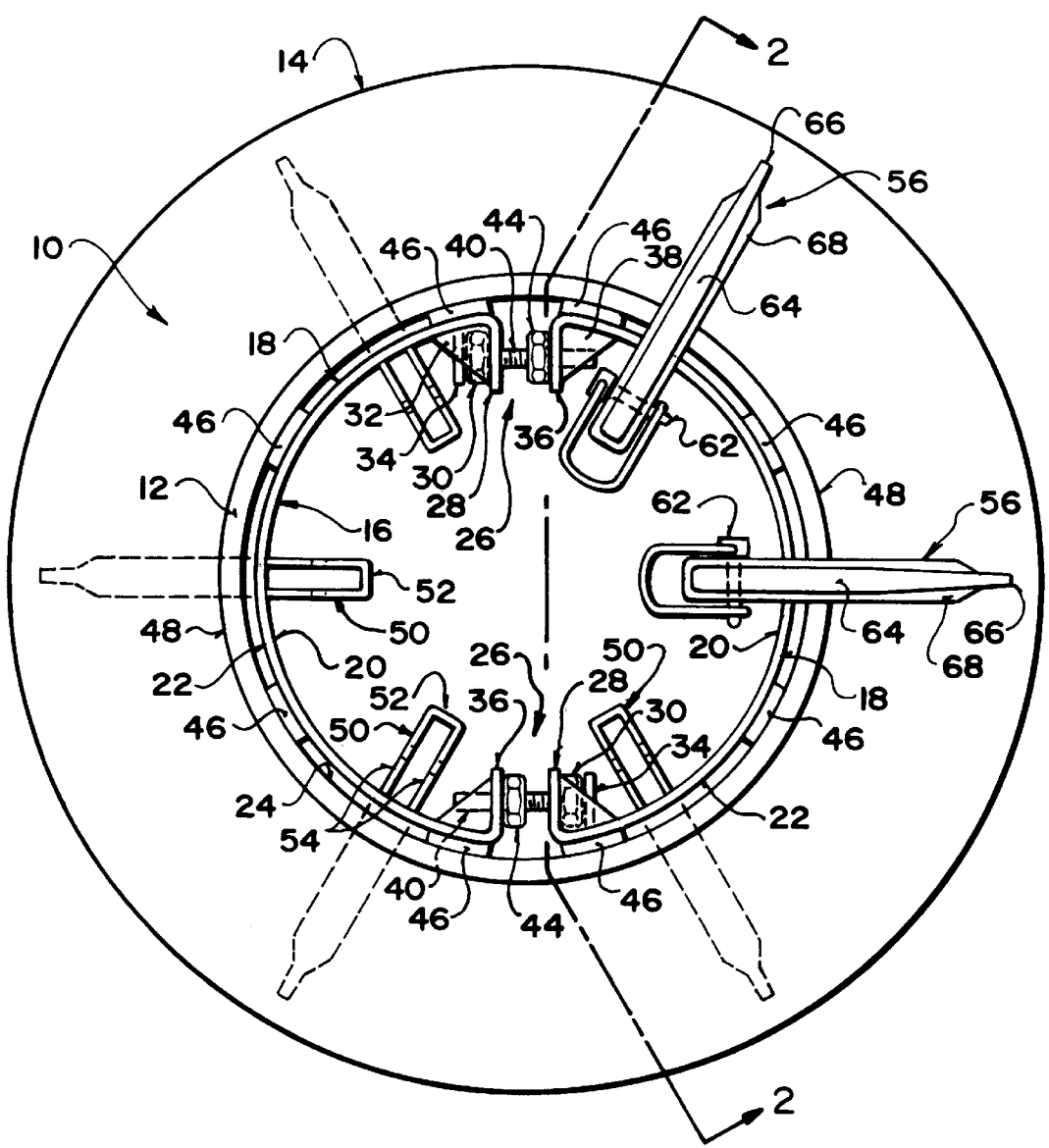
FIG. 1 is a side elevational view of the traction device installed on a wheel rim of a wheel of a all terrain vehicle shown with a portion of the paddles removed.
Figure 2:
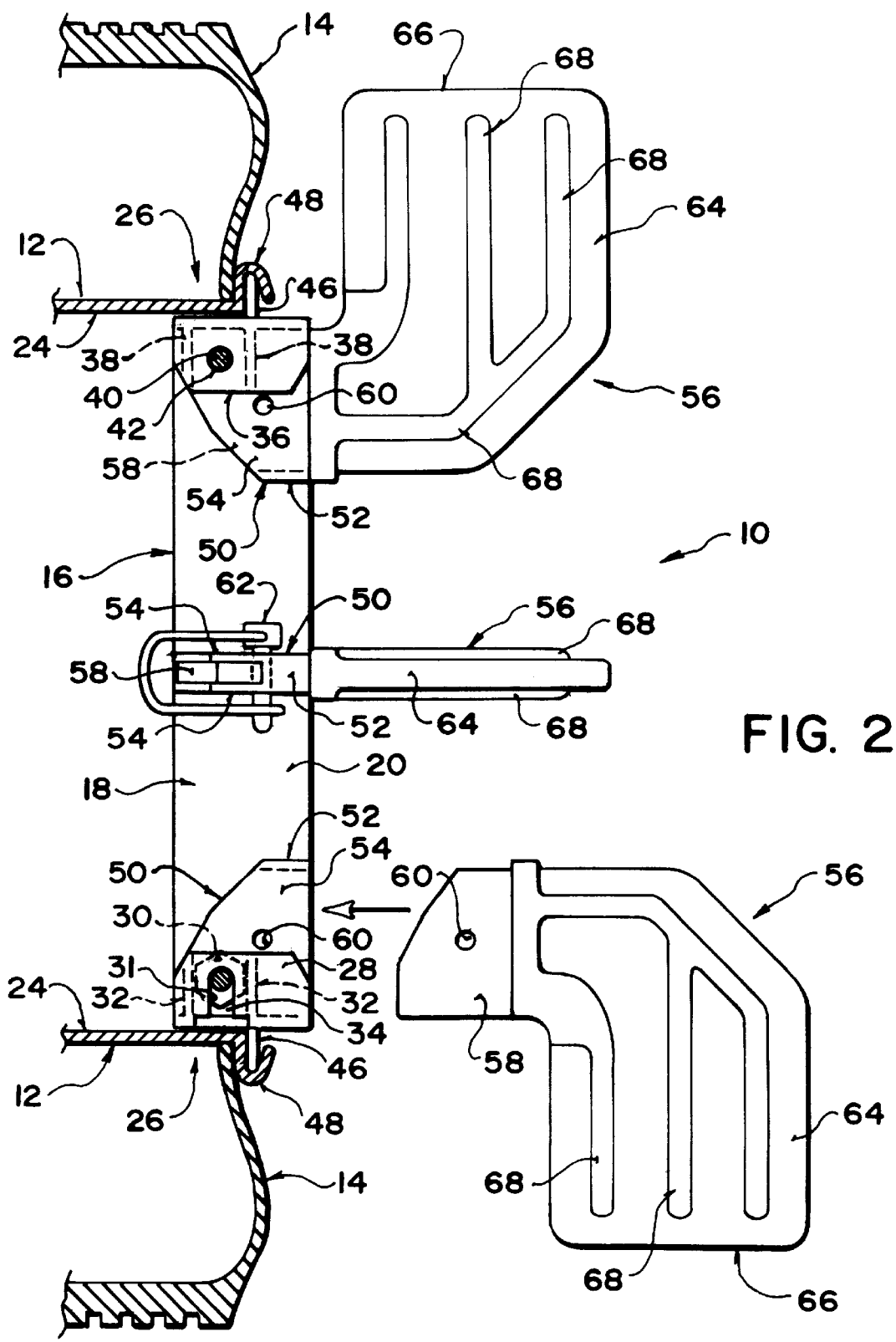
FIG. 2 is a cross sectional view of the traction device along the line 2—2 of FIG. 1.

Referring to the accompanying drawings, there is illustrated a traction device generally indicated by reference numeral 10. The traction device 10 is arranged to mount on the wheel rim 12 of each wheel 14 of an all terrain vehicle. The traction device 10 provides added traction when the vehicle is used on soft terrain including sand, snow or mud. The device is adaptable to the existing rims of the vehicle without the need to replace the rims when mounting the device thereon.

The traction device 10 includes an annular frame member 16 comprising of two arcuate sections 18. Each arcuate section 18 comprises a flat steel band which is bent to form an arc of approximately 180°. Each section 18 thus defines an inwardly facing mounting face 20 and an outwardly facing engaging face 22 which is arranged to engage an inner surface 24 of the wheel rim 14.

A clamping element 26 is coupled between adjacent ends of the arcuate sections 18 when positioned to form the annular frame member. The clamping elements 26 generally comprise a threaded bolt.

Each arcuate section 18 includes a first end flange 28 located at a first end thereof for receiving a bolt head 30 therein. The first end flange 28 includes a mounting slot 31 therein extending inwardly from an outer side of the section 18. The bolt head 30 is thus slidably received therein between a pair of gussets 32 which are mounted between the first end flange and the arcuate section 18 for restricting rotation of the bolt head 30 therebetween. A backing plate 34 is spaced inwardly and parallel to the first end flange 28 to extend radially inward therewith and provide a backing for the bolt head 30.

Each arcuate section 18 further includes a second end flange 36 located at a second end thereof and extending radially inwardly therefrom towards the opposing first end flange. The second end flange 36 is similarly supported by gussets 38 and is arranged to receive a threaded section 40 of the corresponding bolt through a receiving aperture 42 therein.

A nut 44 is threadably mounted on each threaded section 40 between the respective first and second end flanges. Threading the nut 44 along the threaded section 40 away from the bolt head 30 causes the clamping element 26 to expand when the nut engages the second end flange such that the clamping element 26 is mounted under compression for fixedly engaging the annular frame member within the wheel rim 12. An outer side of each nut 44 is serrated for securely engaging the second end flange and to prevent accidentally unthreading the nut therefrom.

A plurality of mounting flanges 46 are spaced about a periphery of the outer engaging face 22 of the annular frame member. The mounting flanges 46 extend radially outward therefrom for being received within a lip 48 of the wheel rim which defines a rim flange for securing the mounting flanges therein. The mounting flanges 46 provide support for securing the annular frame member on the wheel rim in an axial direction.

A set of six U shaped channels 50 are mounted on the inner mounting face 20 of the annular frame member such that the channels are circumferentially spaced about a central frame axis of the frame at an approximate spacing of 60° therebetween. The annular frame member is clamped on the wheel rim such that the frame axis is substantially in alignment with a central axis of the wheel. Each channel 50 includes a base 52 which is mounted spaced inwardly from the frame member 16 by a pair of sides 54 such that the channels 50 each form a substantially tubular member of rectangular cross section with the frame member 16. The channels are oriented such that a longitudinal axis of the tubular member which is defined by the channels extends substantially parallel to the central axis of the wheel.

A paddle 56 is provided associated with each channel 50. The paddles are formed of a resilient material such as rubber which is constructed so as to be sufficiently rigid to provide tractional benefits while being sufficiently resilient to deflect should a solid object such as a rock be encountered.

Each paddle 56 includes a mounting portion 58 of rectangular cross section which is slidably mounted within the corresponding channel 50 to extend axially outward from the annular frame member. A set of co-operating apertures 60 in the channels and the mounting portion of each paddle permits the paddles to be selectively fixed in relation to the channels by insertion of a locking pin 62 through the co-operating apertures wherein the pin 62 includes a spring clip for ensuring the pin remains engaged within the co-operating apertures.

Each paddle 56 further includes a flange portion 64 which is generally flat and rectangular in shape. The flange portions 64 are arranged to extend radially outward from the mounting portions past a periphery of the annular frame member. The flange portions 64 are preferably sized such that an outer free end 66 thereof is adjacent but spaced slightly radially inward from a periphery of a typical wheel 14 of a all terrain vehicle.

A thickness of each flange portion 64 is tapered towards the free end 66 thereof such that the paddle exhibits increased resiliency towards a free end thereof while the mounting portion remains substantially rigid. A plurality of longitudinally extending ridges 68 are mounted along the flange portion 64 of each paddle to extend in a radial direction thereon to increase the bending strength of the flange portions of the paddles in a radial direction while permitting flexing and twisting of the paddles to deflect around rocks and the like which are encountered.

The traction device described herein can be readily installed on various types of rims for use on various applications of different types of vehicles. The traction device is particularly useful on small all terrain vehicles wherein the device is mounted on the rims of each driven wheel of the vehicle. The clamping elements are mounted under compression to expand the annular frame member to fill and engage the inner surface of the wheel rim to frictionally engage the frame member therein and adequately secure the traction device on the wheel.

In order to use the traction device 10 a person first cleans the rim surface of the wheel free from dirt and debris. The clamping elements 26 are mounted between the corresponding pairs of first and second end flanges of the arcuate sections 18 such that the annular frame member may be positioned within the rim of the wheel. Threading the nuts 44 away from the corresponding bolt head provides a force of compression between the second end flange and the opposing backing plate 34 for expanding the annular frame member within the wheel rim.

The use of a locking type of nut 44 is beneficial for ensuring that the clamping element does not become loose once installed. When installing the annular frame member on the wheel rim the mounting flanges 46 must be carefully aligned with the lip 48 of the rim to ensure that they are properly secured therein.

Once the annular frame member has been properly installed the mounting portions of each paddle 56 may be slidably received within the corresponding channel 50 and secured therein using the locking pins 62. Alternatively the use of bolts may be used in place of the locking pins 62 if it is desired to further secure the paddles in position.

Figure 3:
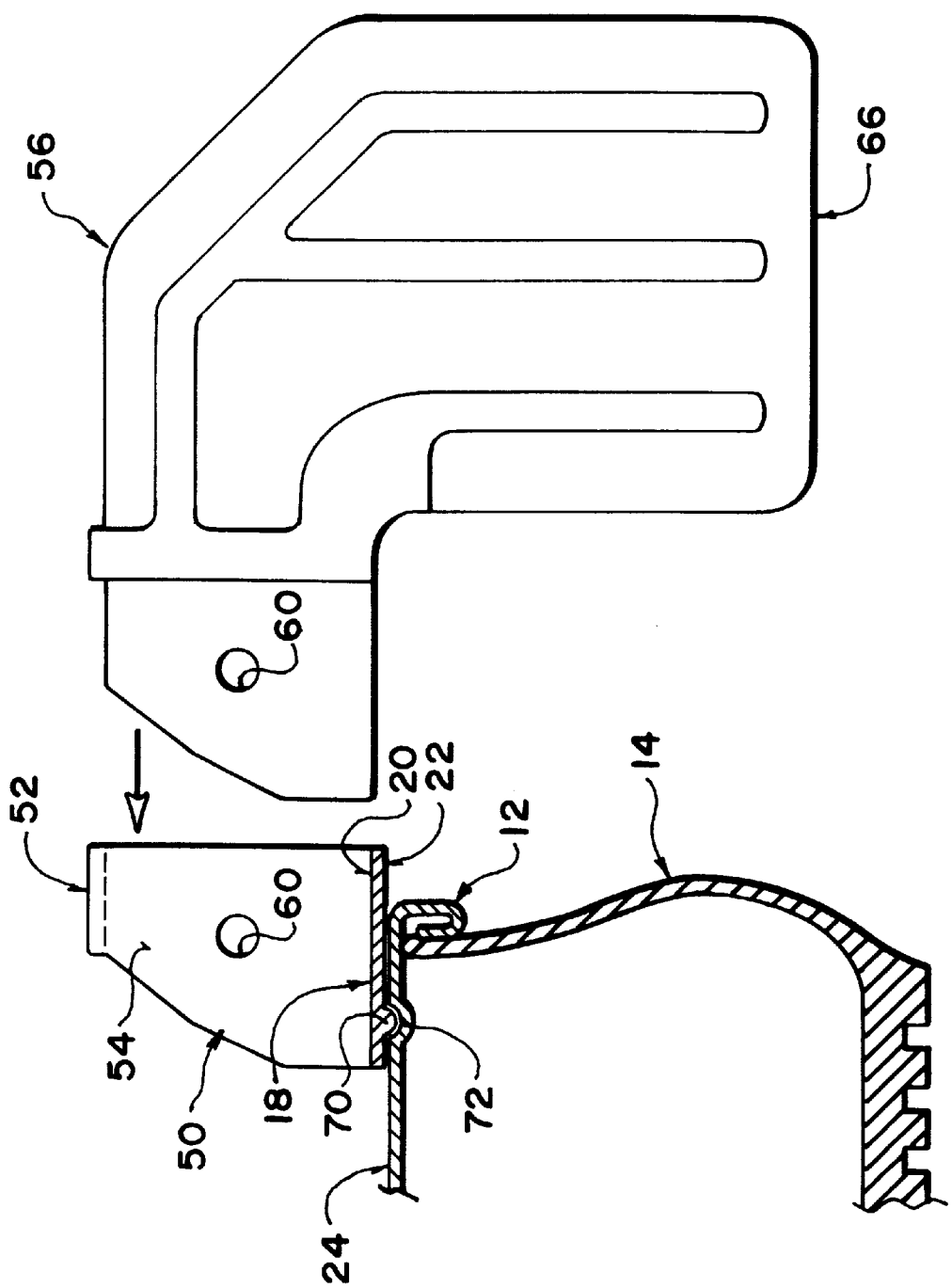
FIG. 3 is a sectional view similar to that of FIG. 2 showing an alternative embodiment of the traction device.

In an alternate arrangement as shown in FIG. 3, the mounting flanges 46 may be replaced by an annular raised protrusion 70 which extends about a periphery of the outer engaging face 22 of the frame member. The alternate arrangement is intended for use with a wheel rim 12 of the type shown in FIG. 3. The rim of FIG. 3 includes an annular groove 72 therein which co-operates with the raised protrusion 70 for receiving the protrusion therein to provide axial support for the annular frame member engaged within the wheel rim.

In further variations of the present invention the annular frame member may be constructed in multiple sizes having different diameters for mounting on corresponding different size diameter wheel rims. A differing number of paddles may also be used on the annular frame member while achieving similar results. In further variations of the clamping element the annular frame member 16 may be alternatively arranged to clamp onto a wheel rim by engaging an outer edge thereof as opposed to being recessed within the rim. Any arrangement wherein the annular frame member is arranged to be selectively clamped on or off the wheel rim would achieve similar results.

While various embodiments of the present invention have been described in the foregoing, it is to be understood that other embodiments are possible within the scope of the invention. The invention is to be considered limited solely by the scope of the appended claims.

What is claimed is:

1. A traction device for use with a wheel having a wheel rim with an inner surface and being rotatable about a wheel axis, the traction device comprising:
   a frame member having a frame axis, an inwardly facing mounting face and an outwardly facing engaging face arranged for engagement with the inner surface of the wheel rim;
   an adjustable clamping element mounted on the frame member arranged to selectively clamp the frame member on the wheel rim with the outwardly facing engaging face of the frame member engaged with the inner surface of the wheel rim and the frame axis of the frame member substantially in alignment with the wheel axis of the wheel rim; and
   a plurality of paddles mounted on the frame member in a circumferentially spaced relationship about the frame axis, each paddle including a mounting portion mounted on the inwardly facing mounting face of the frame member and a flange portion extending outward from the mounting portion to a free end spaced radially outward from the frame axis past the outwardly facing engaging face of the frame member.

2. The traction device according to claim 1 wherein the mounting portion of each paddle extends axially outward from the frame member and the flange portion extends radially outward from the mounting portion.

3. The traction device according to claim 1 wherein the wheel rim includes a peripheral rim flange and wherein the frame member includes a plurality of mounting flanges extending radially outward therefrom for being received within the rim flange of the wheel rim.

4. The traction device according to claim 1 wherein the wheel rim includes an annular groove about an inner surface thereof and wherein the frame member includes a peripheral raised protrusion for being received within the annular groove of the wheel rim.

5. A traction device for use with a wheel having a wheel rim with an inner surface and being rotatable about a wheel axis, the traction device comprising:
   an annular frame member having a frame axis and being formed by a plurality of arcuate sections selectively coupled to each other at respective ends of the sections;
   an adjustable clamping mechanism mounted between the arcuate sections of the frame member for selectively clamping the frame member on the inner surface of the wheel rim with the frame axis substantially in alignment with the wheel axis of the wheel; and
   a plurality of paddles mounted on the frame member in a circumferentially spaced relationship about the frame axis, each paddle including a mounting portion and a flange portion extending outward from the mounting portion to a free end spaced radially outward from the frame axis past a periphery of the frame member.

6. The traction device according to claim 5 wherein the clamping mechanism comprises a clamping element coupling each adjacent pair of ends of the arcuate sections together such that mounting the clamping elements under compression engages the frame member within the wheel rim.

7. The traction device according to claim 6 wherein each clamping element comprises a threaded member secured between the respective adjacent pair of ends of the arcuate sections.

8. The traction device according to claim 5 wherein there is provided two arcuate sections.

9. The traction device according to claim 1 wherein there is provided a plurality of channels mounted on the frame member arranged to slidably mount the respective paddles therein such that the paddles are selectively separable therefrom.

10. The traction device according to claim 9 wherein there is provided a locking member arranged to be mounted on each channel member for selectively mounting the corresponding paddle in a fixed relationship on the channel member.

11. A traction device for use with a wheel having a wheel rim and being rotatable about a wheel axis, the traction device comprising:

a frame member having a frame axis;

an adjustable clamping element mounted on the frame member for selectively clamping the frame member on the wheel rim with the frame axis substantially in alignment with the wheel axis of the wheel; and a plurality of paddles mounted on the frame member in a circumferentially spaced relationship about the frame axis, each paddle including a mounting portion and a flange portion extending outward from the mounting portion to a free end spaced radially outward from the frame axis past a periphery of the frame member;

each paddle being formed of resilient material so as to permit deflection of the free end of the paddle in relation to the frame member.

12. The traction device according to claim 11 wherein there is provided a plurality of radially extending ridges mounted along respective sides of each paddle formed of resilient material to resist bending of the paddle only in a radial direction while permitting the paddle to be twisted.

13. The traction device according to claim 11 wherein a thickness of the resilient material forming each paddle is tapered towards the free end thereof such that the resiliency of each paddle increases towards the free end thereof.

14. A traction device for use with a wheel having a wheel rim and being rotatable about a wheel axis, the traction device comprising;

a plurality of channel members arranged to be mounted in a circumferentially spaced relationship about a central axis;

a mounting mechanism arranged to mount the channel members on the wheel rim with the central axis in alignment with the wheel axis of the wheel;

a paddle associated with each channel member, each paddle having a mounting portion sildably received within the corresponding channel member to extend outward from channel member in a direction of the central axis and a flange portion extending outward from the mounting portion to a free end spaced radially outward from the central axis past the corresponding channel members; and a locking member arranged to be mounted on each channel member for selectively mounting the corresponding paddle in a fixed relationship on the channel member such that the paddles are selectively separable from the respective channel members;

each locking member comprising an elongate member arranged to extend through co-operating apertures in the corresponding channel member and paddle respectively, the locking member being slidably removable from the co-operating apertures for removal of the paddles from the respective channel members.

15. The traction device according to claim 14 wherein the paddles are formed of resilient material.

16. The traction device according to claim 15 wherein there is provided a plurality of radially extending ridges mounted along respective sides of each paddle formed of resilient material to resist bending of the paddle in a radial direction.

17. The traction device according to claim 15 wherein a thickness of the resilient material forming each paddle is tapered towards the free end thereof such that the resiliency of each paddle increases towards the free end thereof.

18. The traction device according to claim 15 wherein each channel member comprises a tubular member of rectangular cross section having a longitudinal axis arranged to extend substantially parallel to the central axis.

* * * * *